United States Patent
Colelli et al.

(10) Patent No.: US 12,255,779 B2
(45) Date of Patent: Mar. 18, 2025

(54) METHOD AND APPARATUS TO CONFIGURE A MULTI-FUNCTION DEVICE

(71) Applicant: Xerox Corporation, Norwalk, CT (US)

(72) Inventors: Dianne Colelli, Webster, NY (US); Cheryl A. Nazzaro, Fairport, NY (US); Mirelsa Fontanes-Perez, Webster, NY (US); Sanja Pstrocki-Porras, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/932,280

(22) Filed: Sep. 14, 2022

(65) Prior Publication Data
US 2024/0089176 A1 Mar. 14, 2024

(51) Int. Cl.
*H04L 41/08* (2022.01)
*H04L 9/40* (2022.01)
*H04L 41/085* (2022.01)

(52) U.S. Cl.
CPC ........ *H04L 41/0886* (2013.01); *H04L 41/085* (2013.01); *H04L 63/083* (2013.01)

(58) Field of Classification Search
CPC ......... H04N 1/00363; G06K 19/06028; G06K 7/1092; H04L 41/0806; H04L 41/0886; H04L 41/085; H04L 63/083; G06F 3/1204; G06F 3/1236
See application file for complete search history.

(56) References Cited

U.S. PATENT DOCUMENTS

| | | | |
|---|---|---|---|
| 6,766,454 B1* | 7/2004 | Riggins | H04L 63/0838 713/185 |
| 8,625,130 B2* | 1/2014 | DeRoller | G06F 3/1218 358/1.14 |
| 8,881,973 B2* | 11/2014 | Ting | G06F 3/1292 235/383 |
| 9,432,182 B2* | 8/2016 | Barrus | G06F 21/6254 |
| 9,794,782 B2 | 10/2017 | Pathuri | |
| 10,129,743 B2* | 11/2018 | Bortnem | H04W 12/06 |
| 10,728,422 B1* | 7/2020 | Packirisamy | H04N 1/00408 |
| 10,757,275 B2* | 8/2020 | Kurihara | H04W 48/20 |
| 10,986,236 B2* | 4/2021 | Panda | H04N 1/00347 |
| 11,435,968 B2* | 9/2022 | Nakamura | H04W 88/08 |

(Continued)

OTHER PUBLICATIONS

Authors et al., Stand Alone Method to Configure a Scanning Printer, An IP.com Prior Art Database Technical Disclosure, ip.com, 2003, IPCOM000014999D (Year: 2003).*

(Continued)

*Primary Examiner* — Alex H. Tran

(57) ABSTRACT

A multi-function device (MFD) is disclosed. For example, the MFD includes a user interface to select a network configuration machine readable code, a processor, and a non-transitory computer-readable medium storing a plurality of instructions. The instructions, when executed by the processor, cause the processor to generate the network configuration machine readable code and print the network configuration machine readable code, wherein the network configuration machine readable code is to be scanned by a target MFD to automatically configure a network connection of the target MFD via information contained in the network configuration machine readable code.

18 Claims, 7 Drawing Sheets

(56) References Cited

U.S. PATENT DOCUMENTS

| | | |
|---|---|---|
| 2014/0359294 A1* | 12/2014 | Armitage ......... G06K 19/06037 |
| | | 235/494 |
| 2015/0016305 A1* | 1/2015 | Douer ................... H04W 48/16 |
| | | 370/254 |
| 2015/0039888 A1 | 2/2015 | Barrus et al. |
| 2015/0169260 A1* | 6/2015 | McLeod ............... G06F 3/1297 |
| | | 358/1.15 |
| 2017/0078145 A1 | 3/2017 | Tesavis et al. |
| 2018/0077255 A1* | 3/2018 | Goto ..................... H04L 67/289 |
| 2019/0012117 A1* | 1/2019 | Zhao .................. H04N 1/32122 |
| 2019/0260602 A1* | 8/2019 | Zsigmond ............. H04W 84/12 |
| 2021/0098103 A1* | 4/2021 | Spotts ....................... G09C 5/00 |
| 2021/0360124 A1 | 11/2021 | Hikichi |
| 2022/0174170 A1* | 6/2022 | Asai ................... H04N 1/00474 |

OTHER PUBLICATIONS

Mrinmay Bhattacharjee, "How to Share Your Wi-Fi SSID & Password Using a QR Code," Technostarry, Jul. 19, 2015, http://www.technostarry.com/share-wi-fi-details-using-qr-code/, 13 pages.
Extended EP Search Report, Application No. 23195023.9, Feb. 2, 2024, 10 pages.

* cited by examiner

METHOD AND APPARATUS TO CONFIGURE A MULTI-FUNCTION DEVICE

The present disclosure relates generally to configuring a multi-function device (MFD) and relates more particularly to a method and apparatus to configure an MFD via a machine readable code printed by another configured MFD.

BACKGROUND

Multi-function devices (MFDs) can be used to perform a variety of different functions. For example, MFDs can perform functions such as printing, copying, faxing, scanning, and the like. As MFDs have become more sophisticated, the MFDs can perform functions that can leverage a network. For example, MFDs can email scanned documents to other users, transmit scanned documents to remote storage locations on the network, retrieve documents from remote storage locations to print, and the like.

To access some of the networked functions, the MFDs are configured by a technician. For example, a technician may go into each MFD to manually configure the MFD to communicate over the network.

SUMMARY

According to aspects illustrated herein, there are provided a multi-function device (MFD), a method for generating a machine readable code, and a method for changing a network setting using a machine readable code scanned by the MFD. One disclosed feature of the embodiments is an MFD that comprises a user interface to select a network configuration machine readable code, a processor, and a non-transitory computer-readable medium storing a plurality of instructions. The instructions, when executed by the processor, cause the processor to generate the network configuration machine readable code and print the network configuration machine readable code, wherein the network configuration machine readable code is to be scanned by a target MFD to automatically configure a network connection of the target MFD via information contained in the network configuration machine readable code. Another disclosed feature is a method for generating a machine readable code. The method executed by a processor of the MFD comprises configuring a network interface of the MFD to connect to a wireless network, receiving a selection to launch a network configuration machine readable code application, generating a machine readable code that includes the wireless network and credentials for the wireless network via the network configuration machine readable code application, and causing the MFD to print the machine readable code.

Another disclosed feature is a method for changing a network setting using a machine readable code scanned by the MFD. The method executed by a processor of the MFD comprises causing a document that includes a machine readable code to be scanned on the MFD, analyzing the machine readable code to determine that the machine readable code includes network configuration information, and changing a network setting on the MFD to connect to a network using the network configuration information obtained from the machine readable code.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for to configure an MFD via a machine readable code printed by another configured MFD. As discussed above, some MFDs can perform functions that can leverage a network. For example, MFDs can email scanned documents to other users, transmit scanned documents to remote storage locations on the network, retrieve documents from remote storage locations to print, and the like. Previously, a technician would go into each MFD to manually configure the MFD to communicate over the network. This would be a time consuming process.

For example, the technician would have to go into the user interface of the MFD to a settings menu. The technician may then have to find the network setup menu within the user interface. The technician may then have to manually select the desired network and enter the network password. The user interface on the MFD may be smaller than typical user interfaces. Thus, entering the information through the user interface may be a slow and cumbersome process. Doing this for several MFDs in a large corporate environment may be time consuming.

The present disclosure provides an apparatus and method to generate a machine readable code from a configured MFD that can be used to automatically configure other MFDs. For example, a technician may configure a first, or source, MFD to a particular network. The MFD may then print a machine readable code that contains the network configuration information.

The technician may then take the printed machine readable code to each remaining target MFD that is not configured for the network. The printed machine readable code may be scanned by a target MFD. The target MFD can recognize the machine readable code, gather the network configuration information from the machine readable code, and automatically configure the target MFD with the network configuration information. As a result, the technician may simply scan the machine readable code on any remaining target MFD to set up the network connection rather than manually going through the user interface of the target MFD and typing the network information.

In one embodiment, the machine readable code may be encrypted. The target MFDs within a particular department or with permission to connect to a particular network may be preloaded with decryption information to decrypt the machine readable code. Thus, the machine readable code may not be used by any device with a scanner to connect to a particular network. As a result, the machine readable code may be used to quickly and securely connect MFDs to a particular network.

Figure 1:
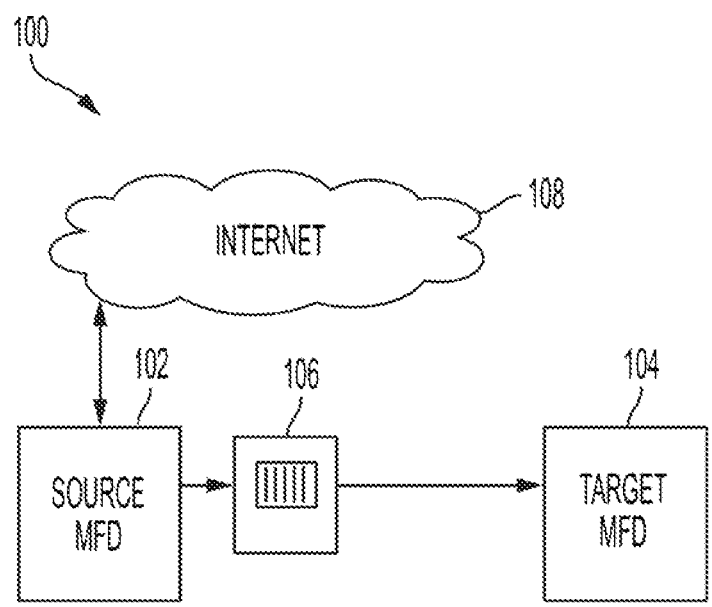
FIG. 1 illustrates a block diagram of an example network that includes a source multi-function device (MFD) to generate a machine readable code for configuring a target MFD of the present disclosure.

FIG. 1 illustrates an example network 100 of the present disclosure. In one embodiment, the network 100 may include a source MFD 102, a target MFD 104, and the Internet 108. The Internet 108 may be an Internet protocol (IP) communications network. The source MFD 102 may be connected to the Internet 108 to communicate with, transmit data to, or receive data from other computing devices and/or servers. The Internet 108 may include additional hardware components not shown, such as a gateway, a firewall, switches, network elements, additional cellular networks or access networks, and the like.

In one embodiment, the Internet 108 may be a local WiFi network. For example, the source MFD 102 may connect to the Internet 108 by selecting a particular service set identifier (SSID) of a local WiFi network and the associated credentials.

Although only a single target MFD 104 is illustrated in FIG. 1, it should be noted that a plurality of target MFDs 104 may be deployed at a location. For example, the source MFD 102 and the target MFD 104 may be located in an office building. In another embodiment, the source MFD 102 and the target MFD 104 may be located on the same floor of an office building. In another embodiment, the source MFD 102 and the target MFD 104 may be located within the same department of an enterprise. In another embodiment, the source MFD 102 and the target MFD 104 may be authorized to use the same local WiFi SSID to connect to the Internet 108.

In another embodiment, the source MFD 102 and the target MFD 104 may each be a device that can perform a variety of different functions. For example, the source MFD 102 and the target MFD 104 may perform print functions, copy functions, scan functions, scan and email functions, scan and store functions, and the like.

As noted above, in some instances, deploying the source MFD 102 and the target MFD 104 within an office building and connecting the source MFD 102 and the target MFD 104 to the Internet 108 may be a time consuming and cumbersome process. In some instances, a user may be required to connect an MFD to the Internet 108. However, the user may not know how to get to a settings menu to configure a network interface of the MFD.

The present disclosure provides the source MFD 102 that may generate a machine readable code 106. The machine readable code 106 may be a bar code or a quick response (QR) code. FIG. 1 illustrates an example where the machine readable code 106 is a bar code.

The machine readable code 106 may be a network configuration machine readable code. For example, the source MFD 102 may be first manually connected to the Internet 108 by a user or a technician. For example, the technician may navigate through a series of menu selections on the user interface of the source MFD 102 to arrive at a network settings menu. The technician may select the SSID of a particular WiFi network to connect to the Internet 108. The technician may enter the network credentials (e.g., a network password for the WiFi SSID).

The technician may then select a network configuration machine readable code application installed on the source MFD 102. The application may allow the technician to generate the machine readable code 106 with all of the network configuration information needed to automatically configure and connect another MFD (e.g., the target MFD 104) to the same WiFi SSID that the source MFD 102 is connected to.

In one embodiment, the machine readable code 106 may be printed onto a medium (e.g., paper). The machine readable code 106 may be scanned by the target MFD 104. The target MFD 104 may analyze the machine readable code 106 to obtain network configuration information to automatically configure a network interface of the target MFD 104 to connect to the Internet 108. Thus, a user may quickly and easily connect the target MFD 104 to the Internet 108 without having to enter any SSID and credentials of a local WiFi network, without knowing how to navigate to the network settings menu via the user interface on the target MFD 104, and the like.

Figure 2:
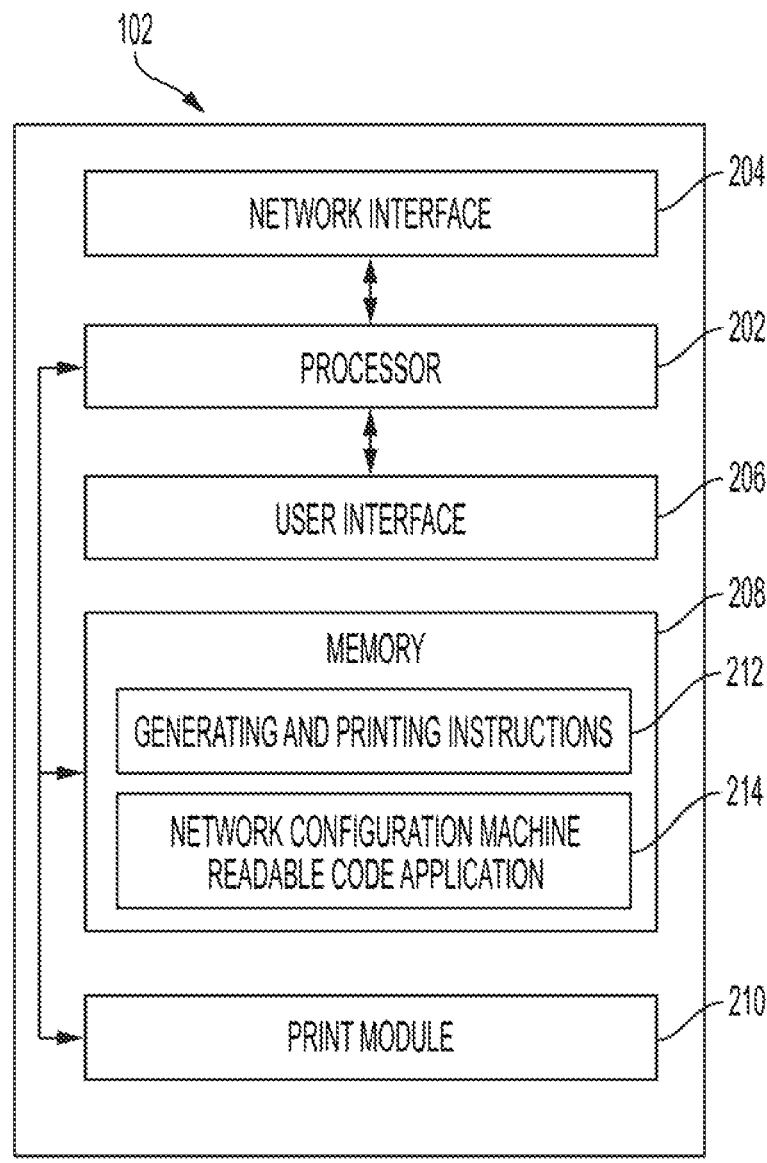
FIG. 2 illustrates a block diagram of an example source MFD of the present disclosure.

FIG. 2 illustrates a block diagram of an example source MFD 102 of the present disclosure. The source MFD 102 may include a processor 202, network interface 204, a user interface 206, a memory 208, and a print module 210. The processor 202 may be communicatively coupled to the network interface 204, the user interface 206, the memory 208, and the print module 210. The processor 202 may control operation of the network interface 204, the user interface 206, and the print module 210. The processor 202 may access information stored in the memory 208 and execute instructions stored in the memory 208.

In one embodiment, network interface 204 may be any type of interface to establish a wired or wireless communication session with the Internet 108. In one embodiment, the network interface 204 may be a wireless network card that can wirelessly connect to a local WiFi network.

In one embodiment, the user interface 206 may be a graphical user interface (GUI). The user interface 206 may include a touch screen interface or may include other input means, such as a keyboard, a keypad, a touch pad, a mouse, and the like. The user interface 206 may display various applications that can be selected by a user for execution.

In one embodiment, the print module 210 may include a paper path and printheads that can dispense printing fluid (e.g., ink or toner) to print an image. The print module 210 may be controlled by the processor 202 to print the machine readable code 106 on a print medium.

In one embodiment, the memory 208 may be any type of non-transitory computer readable medium. For example, the memory 208 may be a random access memory (RAM), a read-only memory (ROM), a solid state drive, a hard disk drive, a non-volatile memory express (NVMe) memory card, and the like.

The memory 208 may store generating and printing instructions 212 and a network configuration machine readable code application 214. The instructions 212 may be executed by the processor 202 to generate the machine readable code 106 with the network configuration information and to control the print module 210 to print the machine readable code 106 on a print medium. The method 500, illustrated in FIG. 5 and discussed below, may provide an example of how the instructions 212 are executed.

In one embodiment, the application 214 may be native application or a third party application. The application 214 may be stored on the memory 208 when the source MFD 102 is manufactured and delivered. In one embodiment, the application 214 may be loaded into memory from an external memory source (e.g., a universal serial bus (USB) memory) connected to the source MFD 102 or from the Internet 108 after the network interface 204 is configured.

In one embodiment, the application 214 may be selected by a user to generate the machine readable code 106 and/or extract information from the machine readable code 106 on the target MFD 104, as discussed below. For example, the application 214 may be selected from the user interface 206.

It should be noted that the source MFD 102 has been simplified for ease of explanation and may include additional components that are not shown. For example, the source MFD 102 may include an optical scanner, paper trays, finishing components (e.g., hole punch, stapler, and the like), USB interfaces, and the like.

Figure 3:
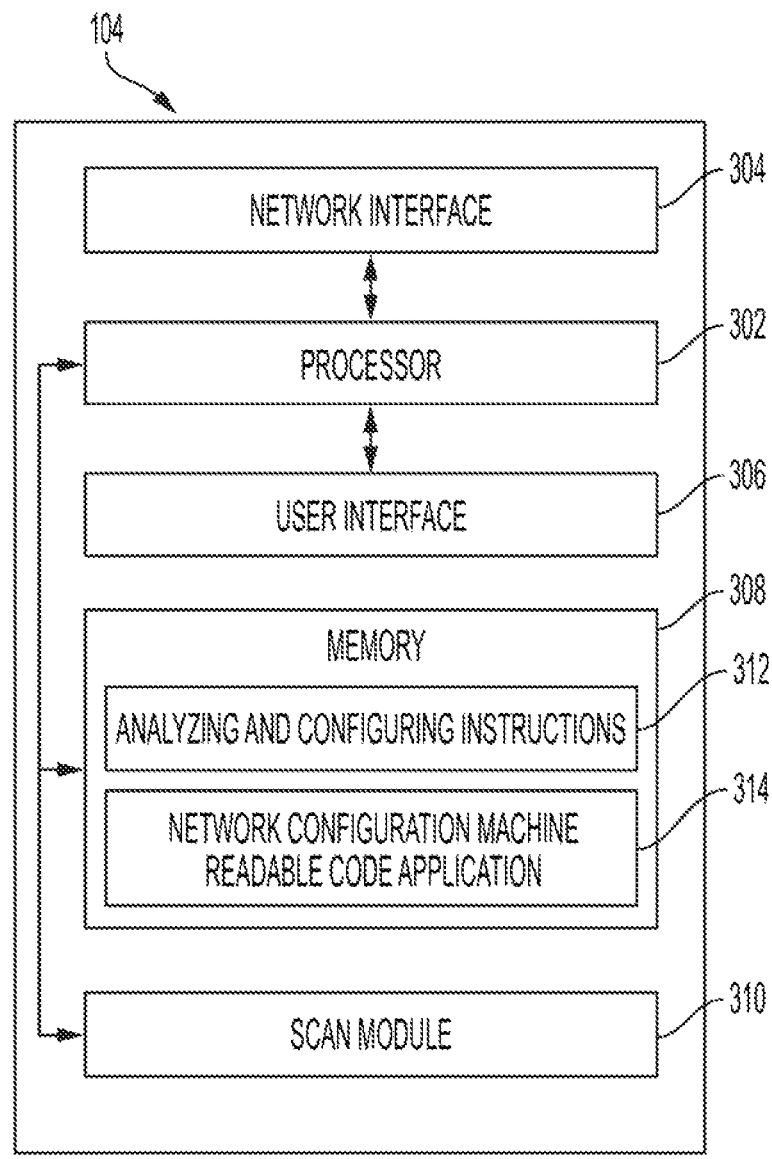
FIG. 3 illustrates a block diagram of an example target MFD of the present disclosure.

FIG. 3 illustrates a block diagram of the target MFD 104. The target MFD 104 may include a processor 302, network interface 304, a user interface 306, a memory 308, and a scan module 310. The processor 302 may be communicatively coupled to the network interface 304, the user interface 306, the memory 308, and the scan module 310. The processor 302 may control operation of the network interface 304, the user interface 306, and the scan module 310. The processor 302 may access information stored in the memory 308 and execute instructions stored in the memory 308.

In one embodiment, network interface 304 may be any type of interface to establish a wired or wireless communication session with the Internet 108. In one embodiment, the network interface 304 may be a wireless network card that can wirelessly connect to a local WiFi network.

In one embodiment, the user interface 306 may be a graphical user interface (GUI). The user interface 306 may include a touch screen interface or may include other input means, such as a keyboard, a keypad, a touch pad, a mouse, and the like. The user interface 306 may display various applications that can be selected by a user for execution.

In one embodiment, the scan module 310 may include an optical scanner to scan an image. For example, the print medium with the machine readable code 106 may be placed on a platen glass of the scan module 310, and the optical scanner may scan the machine readable code 106. The image of the machine readable code 106 may be provided to the processor 302 for analysis and extracting network configuration information from the machine readable code 106.

In one embodiment, the memory 308 may be any type of non-transitory computer readable medium. For example, the memory 308 may be a random access memory (RAM), a read-only memory (ROM), a solid state drive, a hard disk drive, a non-volatile memory express (NVMe) memory card, and the like.

The memory 308 may store analyzing and configuring instructions 312 and a network configuration machine readable code application 314. The instructions 312 may be executed by the processor 302 to analyze the image of the machine readable code 106 scanned by the scan module 310 and to configure the network interface 304 automatically with information extracted from the machine readable code 106. The method 600, illustrated in FIG. 6 and discussed below, may provide an example of how the instructions 312 are executed.

In one embodiment, the application 314 may be a native application or a third party application. The application 314 may be stored on the memory 308 when the target MFD 104 is manufactured and delivered. In one embodiment, the application 314 may be loaded into memory from an external memory source (e.g., a USB memory) connected to the target MFD 104 or from the Internet 108 after the network interface 304 is configured.

In one embodiment, the application 314 may be selected by a user to automatically configure the network interface 304 by scanning the print medium with the machine readable code 106. For example, the application 314 may be selected from the user interface 306.

It should be noted that the target MFD 104 has been simplified for ease of explanation and may include additional components that are not shown. For example, the target MFD 104 may include a print module, paper trays, finishing components (e.g., hole punch, stapler, and the like), USB interfaces, and the like.

Figure 4:
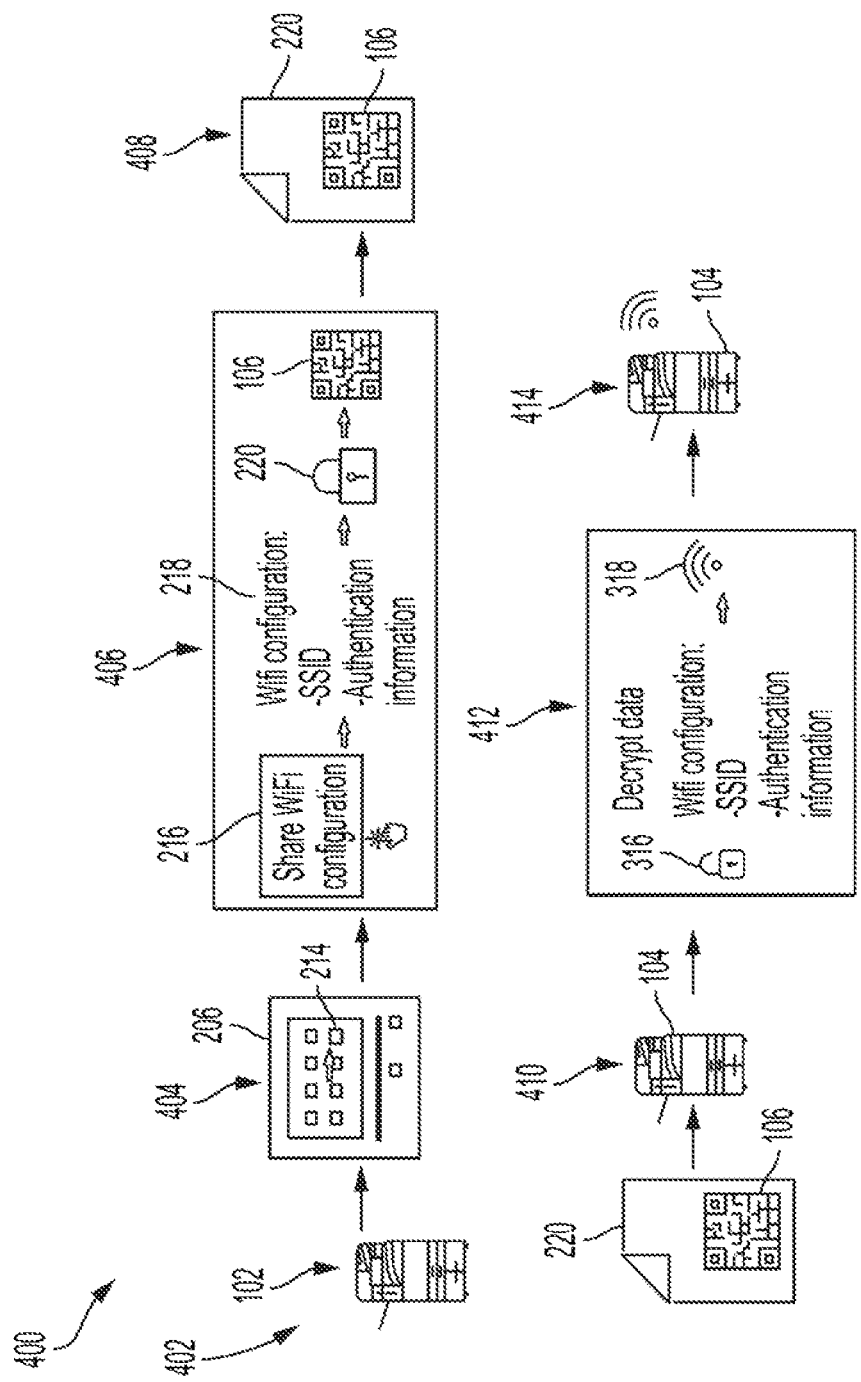
FIG. 4 illustrates a block diagram of an example process flow of the present disclosure.

FIG. 4 illustrates an example process flow 400 for generating the machine readable code 106 and using the machine readable code 106 on the target MFD 104 to automatically configure the network interface 304 of the target MFD 104. The process flow 400 begins at block 402, where the source MFD 102 is connected to a particular network. For example, the network interface 204 of the source MFD 102 may be connected to the SSID of a particular WiFi network.

At block 404, the network configuration machine readable code application 214 may be selected on the user interface 206 of the source MFD 102. For example, a technician may have several other target MFDs 104 to configure to connect to the same WiFi network that is connected to the source MFD 102. Rather than navigating through the user interface of each of the target MFDs 104 and manually re-entering the network configuration information, the technician may simply select the application 214.

At block 406, the source MFD 102 may generate the machine readable code 106. For example, the technician may select a share WiFi configuration option 216 in the application 214. The application 214 may then gather all of the network configuration information 218. For example, the network configuration information 218 may include a network SSID, network credentials (e.g., a password associated with the network SSID), and like.

In one embodiment, the network configuration may include executable code. For example, the executable code may be instructions for the target MFD 104 that can be executed to automatically navigate through menus on the user interface 306 of the target MFD 104, select a network SSID, enter the network credentials, and the like.

In one embodiment, the network configuration information 218 may include permissions to only allow certain MFDs to join the network SSID used by the source MFD 102. For example, MFDs within a certain department, MFDs within a particular location, MFDs on a particular floor, MFDs associated with certain employees, and the like, may be allowed to join the network SSID used by the source MFD 102. This may prevent a user from obtaining the machine readable code 106 and connecting an unknown MFD to the network SSID.

In one embodiment, the network configuration information 218 may be used for MFDs within a particular family of MFDs. For example, a family of MFDs may include MFDs that have a same software version of the application 214 or same release of the operating system software. In another example, a family of MFDs may include MFDs with the same capabilities and/or functions. In one embodiment, a family of MFDs may include MFDs with the same software version and/or release and the same capabilities and/or functions.

In one embodiment, the application 214 may also apply an encryption 220 to the network configuration information 218. The encryption 220 may also add a layer of security to prevent unauthorized users from trying to connect unauthorized MFDs onto the network SSID used by the source MFD 102.

The encryption 220 may use a public and private key pair, a user selected password, and the like. For example, a private key may be stored in the memory 208 or 308 of all authorized MFDs 102 and 104 when manufactured and deployed. In another example, the technician may be prompted to enter a password as part of the share WiFi configuration 216 selection from the application 214.

After encryption, the machine readable code 106 may be generated. The machine readable code 106 is shown as a QR code in the example illustrated in FIG. 4.

At block 408, the machine readable code 106 is printed on to a print medium 220. For example, the source MFD 102 may print the machine readable code 106 onto paper or any other type of print medium.

At block 410, the print medium 220 with the machine readable code 106 is scanned by a target MFD 104. For example, the technician may then take the machine readable code 106 to a target MFD 104 and scan the machine readable code 106 to automatically configure the network settings or network interface 304 to establish a connection to the same network SSID used by the source MFD 102.

In one embodiment, the technician may select the application 214 on the user interface 306 of the target MFD 102. The application 214 may have an option to configure WiFi with a machine readable code. The user may select the option to configure WiFi and scan the machine readable code 106.

In one embodiment, the machine readable code 106 may include data that causes the target MFD 104 to automatically configure network settings using information contained in the machine readable code 106. For example, the machine readable code 106 may include a particular area that includes bits of code indicating that the machine readable code 106 is to be used to automatically configure network settings.

As a result, the technician may simply scan the machine readable code 106 on the target MFD 104 without selecting the application 214. The machine readable code 106 may include executable code or instructions that can be executed by the target MFD 104 to automatically navigate through menus of the user interface 306 to arrive at a network settings menu. The target MFD 104 may select the network SSID provided in the machine readable code 106 and enter the network credentials or authentication information for the network SSID.

At block 412, the target MFD 104 decrypts and analyzes the machine readable code 106. For example, if the machine readable code 106 was encrypted, the target MFD 104 may apply a decryption 316. The decryption 316 may be performed with a private key that is loaded into the memory 312 of the target MFD 104 during manufacturing or after delivery and installation of the target MFD 104. The decryption 316 may also be performed by prompting a user for a password, if a password is used to encrypt the machine readable code 106, as described above in block 406.

In one embodiment, after decryption, the target MFD 104 may check permissions to ensure that the target MFD 104 is authorized to connect to the network SSID used by the source MFD 102. For example, the target MFD 104 may check to ensure that the target MFD 104 is part of the same family of MFDs as the source MFD 102. In another example, the target MFD 104 may check to ensure that the target MFD 104 has permission to join the network SSID used by the source MFD 102.

If the target MFD 104 has permission to join the network SSID used by the source MFD 102, the target MFD 104 may apply the network configuration information 218. In other words, the network configuration information 218 may be used to configure the network settings 318, as described above, using the network configuration information 218 extracted from the machine readable code 106.

At block 414, the network interface 304 of the target MFD 104 is connected to the same network SSID as used by the source MFD 102. The machine readable code 106 can be taken to other target MFDs 104 to automatically configure the network settings of remaining target MFDs 104 in a similar manner.

Figure 5:
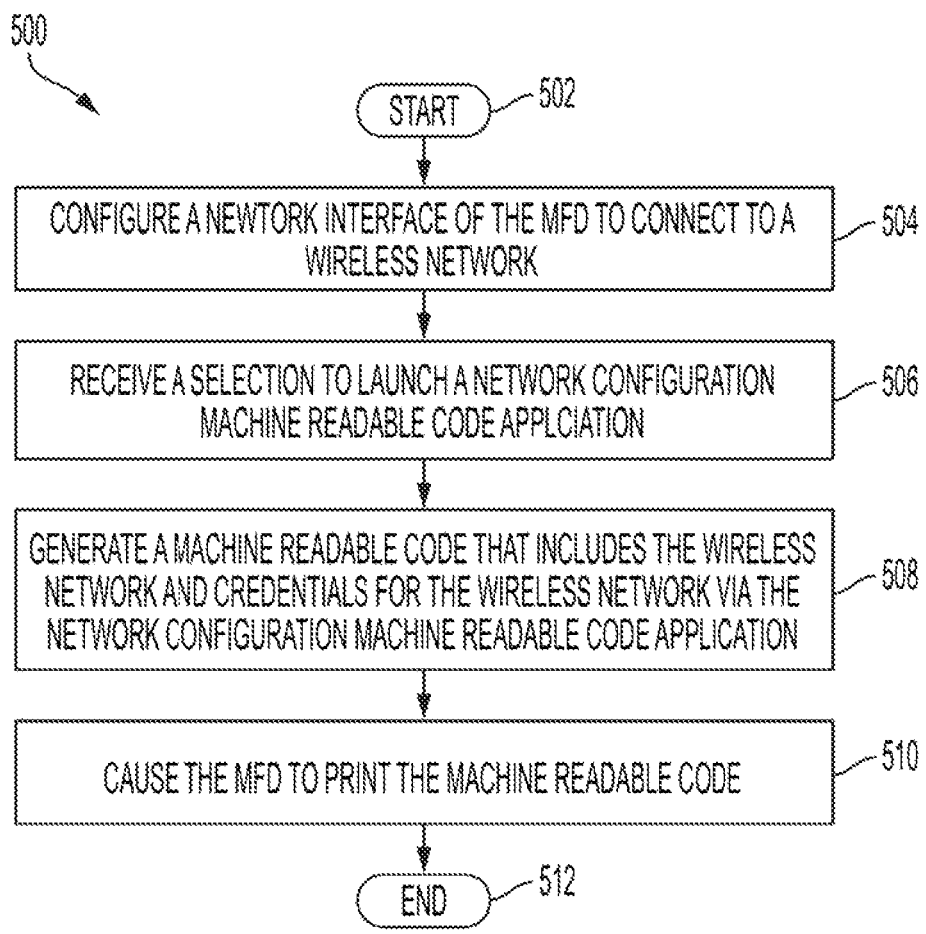
FIG. 5 illustrates a flow chart for a method of generating a machine readable code to configure a target MFD of the present disclosure.

FIG. 5 illustrates a flow chart of an example method 500 for generating a machine readable code to configure a target MFD of the present disclosure. In one embodiment, the method 500 may be performed by the apparatus 102 or by an apparatus such as the apparatus 700 illustrated in FIG. 7 and discussed below.

In one embodiment, the method 500 begins at block 502. At block 504, the method 500 configures a network interface of the MFD to connect to a wireless network. For example, the MFD may select a network SSID and enter associated network credentials (e.g., a network password) associated with the network SSID.

At block 506, the method 500 receives a selection to launch a network configuration machine readable code application. For example, the application may be selected from a user interface of the MFD. The application may have an option to "share WiFi configuration" or "generate a network configuration machine readable code."

At block 508, the method 500 generates a machine readable code that includes the wireless network and credentials for the wireless network via the network configuration machine readable code application. In response to selecting the application, the MFD may gather the network configuration information associated with the network that is connected to the network interface of the MFD. The network configuration information may be converted into a machine readable code that can be scanned by a target MFD to allow the target MFD to automatically configure itself to connect to the same network SSID used by the MFD that generated the machine readable code. The machine readable code may be a QR code, a bar code, or the like.

In one embodiment, the network configuration information may include any information needed by a target MFD to connect to the same network used by the MFD generating the machine readable code. For example, the network configuration information may include a network SSID, network credentials or a network password, and the like.

In one embodiment, the network configuration information may include executable code that causes the target MFD to automatically navigate through menus to the network settings menu on the target MFD and apply the network configuration information included in the machine readable code. The network configuration information may also include permissions to only allow certain MFDs (e.g., based on location, department, user, family of MFDs, and the like) to connect to the network SSID used by the MFD generating the machine readable code.

In one embodiment, the machine readable code may be encrypted for security. For example, the encryption may be applied with a public/private key pair, a user selected password, and the like.

At block 510, the method 500 causes the MFD to print the machine readable code. For example, after the machine readable code is generated, the machine readable code may be printed onto a print medium (e.g., paper). At block 512, the method 500 ends.

Figure 6:
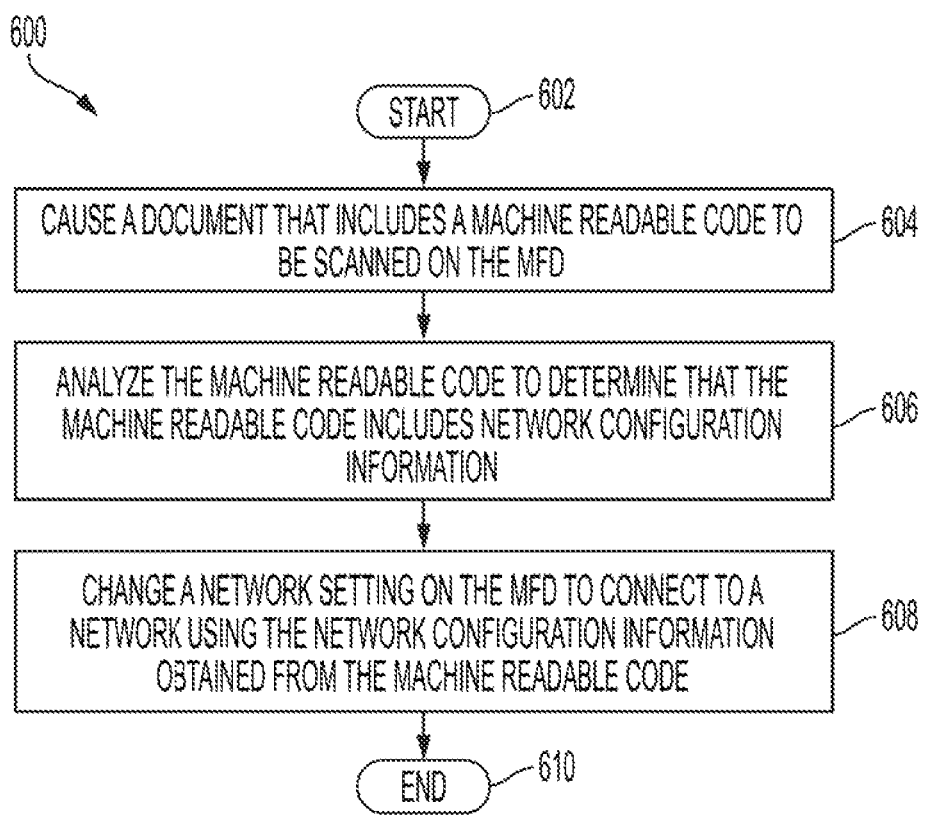
FIG. 6 illustrates a flow chart for a method of configuring a target MFD with a machine readable code generated by a source MFD of the present disclosure.

FIG. 6 illustrates a flow chart of an example method 600 for configuring a target MFD with a machine readable code generated by a source MFD of the present disclosure. In one embodiment, the method 600 may be performed by the apparatus 104 or by an apparatus such as the apparatus 700 illustrated in FIG. 7 and discussed below.

In one embodiment, the method 600 begins at block 602. At block 604, the method 600 causes a document that includes a machine readable code to be scanned on the MFD. For example, a user or technician may want to configure the network settings for the MFD. However, rather than manually navigating through the menus and manually selecting and entering the network information, the user or technician may scan a printed network configuration machine readable code using the optical scanner of the MFD.

At block 606, the method 600 analyzes the machine readable code to determine that the machine readable code includes network configuration information. In one embodiment, the user may select a network configuration machine readable code application on the MFD. The application may prompt the user to scan the machine readable code and the MFD may analyze the machine readable code via the application.

In one embodiment, the machine readable code may include data that indicates that the machine readable code is for automatically configuring the network settings on the MFD. The machine readable code may include executable code that causes the MFD to automatically navigate menus of the user interface to the network settings menu. The MFD may then select the network SSID and enter the network password included in the machine readable code. Thus, user may not need to select the application on the user interface. Rather, the user may simply scan the machine readable code, and the MFD may automatically recognize the machine readable code and automatically configure itself to connect to a particular network SSID.

In one embodiment, the machine readable code may be encrypted. The MFD may decrypt the machine readable code before analyzing the machine readable code. The MFD may apply a private key stored in the memory to decrypt the machine readable code. In another embodiment, the MFD may prompt the user for a password that was applied when the machine readable code was generated.

At block 608, the method 600 changes a network setting on the MFD to connect to a network using the network configuration information obtained from the machine readable code. In one embodiment, the MFD may determine whether the MFD has permission to join the network included in the network configuration information before changing the network settings. For example, only certain MFDs may be allowed to join the network included in the network configuration information. The permission may be based on location, department, user, family of MFDs, and the like, as described above. At block 610, the method 600 ends.

Figure 7:
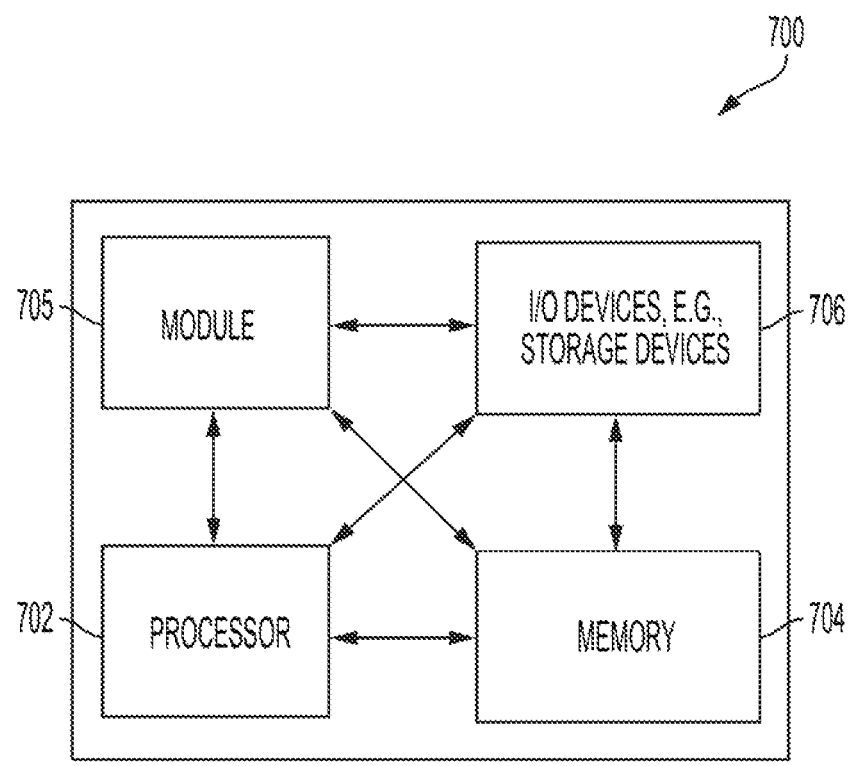
FIG. 7 illustrates a high-level block diagram of an example computer suitable for use in performing the functions described herein.

FIG. 7 depicts a high-level block diagram of a computer that is dedicated to perform the functions described herein. As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 for generating a machine readable code or decrypting a machine readable code, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for generating a machine readable code or decrypting a machine readable code (e.g., a software program comprising computer-executable instructions) can be loaded into memory 704 and executed by hardware processor element 702 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for generating a machine readable code or decrypting a machine readable code (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-function device (MFD), comprising:
a user interface to select a network configuration machine readable code application;
a processor; and
a non-transitory computer-readable medium storing a plurality of instructions, which when executed by the processor, causes the processor to:
generate a network configuration machine readable code, wherein the network configuration machine readable code comprises a certain group of MFDs that have permission to join a network connection associated with the network configuration machine readable code, wherein the certain group of MFDs comprises MFDs within a certain department, MFDs within a particular location, or MFDs on a particular floor; and print the network configuration machine readable code, wherein the network configuration machine readable code is to be scanned by a target MFD to automatically configure the network connection of the target MFD that is part of the certain group of MFDs that have permission via information contained in the network configuration machine readable code.

2. The MFD of claim 1, wherein the network configuration machine readable code comprises a quick response (QR) code or a bar code.

3. The MFD of claim 1, wherein the network configuration machine readable code is encrypted with a private key.

4. The MFD of claim 3, wherein the private key is preloaded into the non-transitory computer readable medium of the MFD.

5. The MFD of claim 3, wherein the private key is a user selected password entered in the network configuration machine readable code application via the user interface.

6. The MFD of claim 1, wherein the network configuration machine readable code includes a network identification and a network password.

7. The MFD of claim 1, wherein the network configuration machine readable code is generated for a same software version as the target MFD.

8. A method, comprising:
configuring, by a processor of a multi-function device (MFD), a network interface of the MFD to connect to a wireless network;
receiving, by the processor, a selection to launch a network configuration machine readable code application;
generating, by the processor, a machine readable code that includes an identification of the wireless network and credentials for the wireless network via the network configuration machine readable code application and a certain group of MFDs that have permission to join a network connection associated with the machine readable code, wherein the certain group of MFDs comprises MFDs within a certain department, MFDs within a particular location, or MFDs on a particular floor; and
causing, by the processor, the MFD to print the machine readable code, wherein the machine readable code includes data to cause a target MFD that is part of the certain group of MFDs that have permission to automatically configure a network setting for the network connection using information contained in the machine readable code.

9. The method of claim 8, further comprising:
encrypting, by the processor, the machine readable code.

10. The method of claim 9, wherein the encrypting comprises:
applying, by the processor, a private key that is preloaded into a memory of the MFD.

11. The method of claim 9, wherein the encrypting comprises:
prompting, by the processor, a user to enter a password in the network configuration machine readable code application via a user interface; and
applying, by the processor, the password to encrypt the machine readable code.

12. The method of claim 8, wherein the machine readable code comprises a quick response (QR) code or a bar code.

13. A method, comprising:
causing, by a processor of a multi-function device (MFD), a document that includes a machine readable code to be scanned on the MFD;
analyzing, by the processor, the machine readable code to determine that the machine readable code includes network configuration information;
determining, by the processor, that the MFD has permission to join a network included in the network configuration information before changing a network setting based on the MFD being part of a certain group of MFDs included in the machine readable code that have permission to join the network, wherein the certain group of MFDs comprises MFDs within a certain department, MFDs within a particular location, or MFDs on a particular floor; and
changing, by the processor, the network setting on the MFD to connect to the network using the network configuration information obtained from the machine readable code.

14. The method of claim 13, wherein the analyzing, comprises:
decrypting, by the processor, the machine readable code with a decryption key.

15. The method of claim 14, wherein the decryption key is preloaded onto a memory the MFD.

16. The method of claim 14, wherein the decryption key is a password applied by a user when the machine readable code was generated by a source MFD that is connected to the network.

17. The method of claim 13, further comprising:
receiving, by the processor, a selection of a network configuration machine readable code application before scanning the document that includes the machine readable code.

18. The method of claim 13, wherein the analyzing comprises:
determining, by the processor, that the network configuration information is compatible with a software version of the MFD before changing the network setting.

* * * * *